(12) United States Patent
Carter

(10) Patent No.: US 10,162,840 B1
(45) Date of Patent: Dec. 25, 2018

(54) METHOD AND SYSTEM FOR AGGREGATING FINANCIAL MEASURES IN A DISTRIBUTED CACHE

(71) Applicant: JPMorgan Chase Bank, N.A., New York, NY (US)

(72) Inventor: Christopher Richard Carter, West Sussex (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 644 days.

(21) Appl. No.: 14/842,966

(22) Filed: Sep. 2, 2015

(51) Int. Cl.
  *G06F 17/30* (2006.01)
(52) U.S. Cl.
  CPC .............................. *G06F 17/30292* (2013.01)
(58) Field of Classification Search
  USPC ........ 707/737, 608, 692, 664, 964, 661, 674
  See application file for complete search history.

(56) References Cited

U.S. PATENT DOCUMENTS

| | | | | |
|---|---|---|---|---|
| 2007/0094042 A1* | 4/2007 | Ramer | .............. | G06F 17/30867 705/1.1 |
| 2010/0250497 A1* | 9/2010 | Redlich | .................. | F41H 13/00 707/661 |
| 2010/0332475 A1* | 12/2010 | Birdwell | ........... | G06F 17/30333 707/737 |
| 2013/0291060 A1* | 10/2013 | Moore | ................ | G06F 21/6245 726/1 |
| 2015/0094968 A1* | 4/2015 | Jia | .......................... | G06Q 40/04 702/60 |

* cited by examiner

*Primary Examiner* — Sana A Al-Hashemi
(74) *Attorney, Agent, or Firm* — Hunton Andrews Kurth LLP

(57) ABSTRACT

According to an embodiment of the present invention, a system and method for consolidating financial data comprising: a relational database containing a plurality of schema comprising a staging schema, recent schema and historic schema; a distributed data storage platform comprising a plurality of nodes; and a computer processor, coupled to the relational database and the distributed data storage platform, and programmed to: store financial data in the distributed data storage platform comprising the plurality of nodes; create an aggregation specification to compute an aggregation for a financial measure; determine whether the aggregation is current; compose one or more keys for the aggregation specification; determine one or more dimensions for the keys; responsive to the keys and dimensions, process the aggregation specification via the plurality of nodes; and combine one or more aggregations to create a new aggregation algorithm.

20 Claims, 11 Drawing Sheets

```
<?xml version="1.0" encoding="UTF-8"?><reportDefinition xmlns="http://www.company.com/aggregator/reportdefinition" xmlns:xsi="http://www.w3.org/2001/XMLSchema-
instance" anonymous="false" name="Explains - Estimated" region="CITY" schema-version="0.0.1" showRowTotals="false" treePath="Report Components|Pnl Official P&L
Reports" version="0.1" xsi:schemaLocation="http://www.company.com/reportdefinition report-definition.xsd">
  <contexts>
    <context name="underlyingReport1">
      <reportReference reportName="PnL Predicts - Estimated" reportVersion="0.1">
        <context javaType="java.util.Date" name="EFFECTIVE_DATE"/>
      </reportReference>
    </context>
    <context name="underlyingReport2">
      <reportReference reportName="Higher Order - Estimated" reportVersion="0.1">
        <context javaType="java.util.Date" name="EFFECTIVE_DATE"/>
      </reportReference>
    </context>
  </contexts>
  <forEach>
    <measure refName="underlyingReport1" refType="context" type="report"/>
  </forEach>
  <forEach>
    <measure refName="underlyingReport2" refType="context" type="report"/>
  </forEach>
<formula><![CDATA[
import com.company.cache.domain.reports.AbstractReportCalculation;
import com.company.cache.domain.*;
import com.company.cache.domain.trademetrics.*;
import com.company.datacontainer.*;
import com.company.datacontainer.builder.*;

class Report extends AbstractReportCalculation {
  IMeasure evaluate(
    MeasureKey aggregationKey,
    Map resultMap,
    MeasureKey forEachMeasureKey,
    IMeasure forEachMeasure,
    IMeasureContainer value,
    Map variables){
      aggregationKey.addKeyComponent("IS_ADJUSTMENT", "FALSE");
      aggregationKey.addKeyComponent("MEASURE_NAME", "Explains");

return forEachMeasure;
    }
}]]></formula>
</reportDefinition>
```

Figure 5

- Official T PNL - Estimated
  - Underlying T PNL - Estmated
    - Explains - Estimated
      - PNL Predicts - Estimated
        - AggregatorPredictFilter
          - PredictFilter
            - KExportReportExplainMagicNumbersByRowEODBase
            - KExportReportPNLPredictMagicNumbersByRowEODBase
            - KI-FuturesExportReportExplainMagicNumbersByRowEODBase
          - AdHocPredictFilter
            - KAdHoc ExportReportExplainMagicNumbersByRowEODBase
      - P IR Futures PNL - Estimated
        - P Futures PNL - Estimated
          - CurrencyDecoratorBaseCcy
            - PIRFuturesEnabler
              - FabricPFuturePNLEODBase
      - K Futures PNL
        - K Futures IRF PNL USD
          - KIFuturesIRFEnabler
            - CurrencyDecoratorBaseCcy
              - K Futures Daily PNL Base Ccy
                - K-FuturesPNLEODBase
        - K Futures FX Reval FXDelta
          - KFuturesFXDeltaEnabler
            - K Futures FX Reval
              - K Futures MTD CCY PNL
                - K Futures MTD CCY PNL [K MTD]
                  - K-FuturesPNLEODBase
        - NewEqFutsTradeEnabler
          - EquityDivPortfolioEnabler
            - K Futures IDX PNL USD
              - KFuturesIDXEnabler
                - IntFXEnvFilter
                  - CurrencyDecoratorBaseCcy
                    - K Futures Daily PNL Base Ccy
                      - K-FuturesPNLEODBase
              - KFuturesIDXEnabler
                - IntFXEnvEnabler
                  - CurrencyDecorater
                    - IntFxNewTradeEQFutureEnabler
                      - BaseToReportCurrencyMapper
                        - K Futures Daily PNL Base Ccy

Figure 6

```xml
<?xml version="1.0" encoding="UTF-8"?><reportDefinition xmlns="http://www.company.com/reportdefinition" xmlns:xsi="http://www.w3.org/2001/XMLSchema-instance" executionLevel="BASE" name="KIR CurveEODBase" region="CITY" schema-version="0.0.2" treePath="Report Components\Base Reports" version="0.1" xsi:schemaLocation="http://www.company.com/aggregator/reportdefinition report-definition.xsd">
  <contexts>
    <context javaType="java.util.Date" name="EFFECTIVE_DATE" netType="System.DateTime" title=" Context Date"/>
  </contexts>
  <forEach>
    <measure type="risk">
      <measureKey>
        <keyComponent name="MEASURE_NAME" value="KIR CurveEOD"/>   810
        <keyComponent name="EFFECTIVE_DATE" refName="EFFECTIVE_DATE" refType="context"/>
      </measureKey>
    </measure>
  </forEach>
</reportDefinition>
```

Figure 8

METHOD AND SYSTEM FOR AGGREGATING FINANCIAL MEASURES IN A DISTRIBUTED CACHE

FIELD OF THE INVENTION

The present invention relates generally to consolidating financial information and more specifically to aggregating and disaggregating financial information on a distributed storage platform.

BACKGROUND OF THE INVENTION

Consolidating risk and profit/loss information for commercial investment banks is a big data problem. To accurately compute consolidated measures of risk and profit loss requires non trivial aggregation algorithms to be applied over large datasets. For the interest rates and currencies business of a major corporate or investment bank alone, these data sets are of the order of billions of records.

Current approaches increase the complexity with which algorithms are developed and deployed and further create a conflict between the optimum form for storing the data over the longer term, and the form in which the data is used at the point at which the aggregation algorithm is executed.

Other drawbacks may also be present.

SUMMARY OF THE INVENTION

Accordingly, one aspect of the invention is to address one or more of the drawbacks set forth above. According to an embodiment of the present invention, an automated computer implemented system for consolidating financial data comprises: a relational database containing a plurality of schema comprising a staging schema, recent schema and historic schema; a distributed data storage platform comprising a plurality of nodes; and a computer processor, coupled to the relational database and the distributed data storage platform, and programmed to: store financial data in the distributed data storage platform comprising the plurality of nodes; create an aggregation specification to compute an aggregation for a financial measure; determine whether the aggregation is current; compose one or more keys for the aggregation specification; determine one or more dimensions for the keys; responsive to the keys and dimensions, process the aggregation specification via the plurality of nodes; and combine one or more aggregations to create a new aggregation algorithm.

According to another embodiment of the present invention, an automated computer implemented method for consolidating financial data, wherein the method comprising the steps of: storing financial data in a relational database in a distributed data storage platform comprising a plurality of nodes, wherein the relational database contains a plurality of schema comprising a staging schema, recent schema and historic schema and the distributed data storage platform comprises a plurality of nodes; creating an aggregation specification to compute an aggregation for a financial measure; determining whether the aggregation is current; composing one or more keys for the aggregation specification; determining one or more dimensions for the keys; responsive to the keys and dimensions, processing the aggregation specification via the plurality of nodes; and combining one or more aggregations to create a new aggregation algorithm.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

FIG. 5 illustrates an exemplary aggregation specification element, according to an embodiment of the present invention.

FIG. 6 is an exemplary screenshot of a recursive aggregation specification structure, according to an embodiment of the present invention.

FIG. 8 is an exemplary terminating aggregation specification element, according to an embodiment of the present invention.

DESCRIPTION OF EMBODIMENTS OF THE INVENTION

Figure 1:
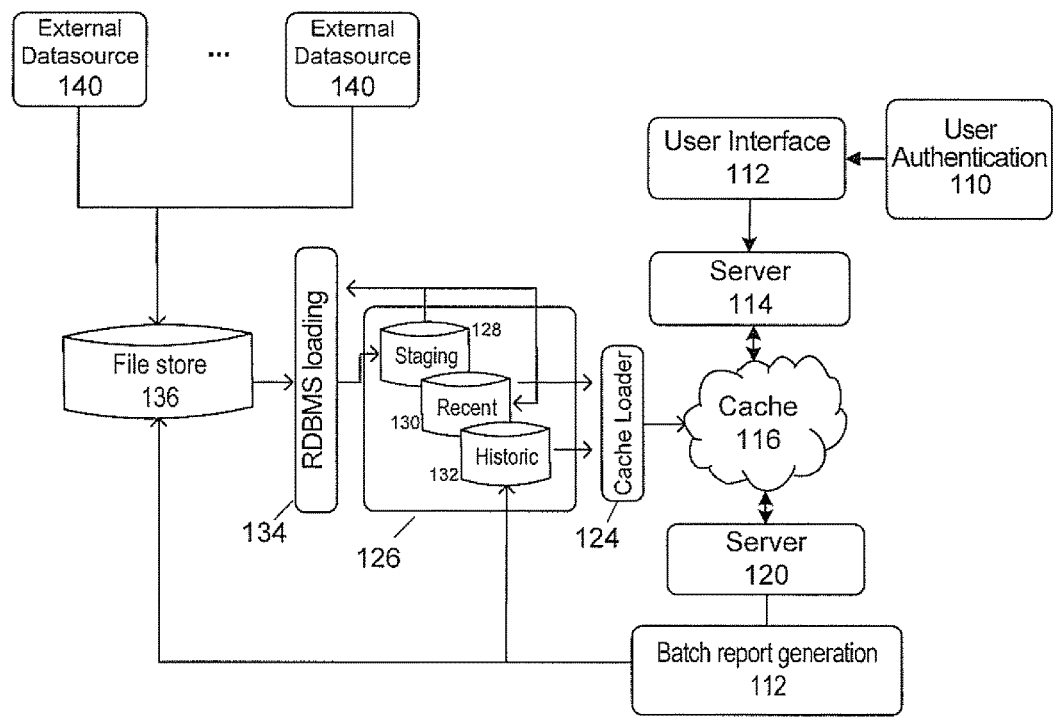
FIG. 1 is an exemplary contact center deployment implementation architecture, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to efficiently and arbitrarily aggregating and disaggregating financial information on a distributed data storage platform wherein the measures of the financial information are distinct and in different currencies and/or expressed in different units of measure, and may be grouped by different attributes of the associated transactional information. An embodiment of the present invention computes aggregations directly over a serialized form without the need for deserialization by serializing the data in a manner that is efficient yet tractable for fast computation.

An embodiment of the present invention minimizes increased complexity with which algorithms are developed and/or deployed by a framework that captures user supplied declarations to describe context of an algorithmic step and semantics of the algorithmic step. The context of an algorithmic step may represent the position of the step in the sequence of the algorithmic steps, together with descriptions of the expected inputs and outputs. The semantics of the algorithmic step may represent what the algorithm actually does. According to an exemplary application, the context may be expressed in XML and the semantics may be expressed in a scripting language. An exemplary scripting language may include Groovy Script which is a superset of the Java programming language as well as Turing Complete. Other scripting languages, including object-oriented programming languages, may be used.

According to an embodiment of the present invention, at runtime, the declarations may be saved and compiled into a form the distributed aggregation engine subsequently runs. This approach of an embodiment of the present invention may remove or minimize the need for formal code deployment. For example, a conflict between an optimum form for storage and an optimum form for computation may be addressed and/or solved by a complete and self-describing binary form, which may be stored and transmitted, but which may be sufficiently tractable for the aggregation engine to consume without loss of performance. According to an exemplary embodiment, this form may be useful for aggregation of measures that may be expressed in money. More general use cases may involve extension and/or modification within the context of the embodiments of the present invention.

An embodiment of the present invention is directed to a method and system for efficiently and arbitrarily aggregating and disaggregating financial information on a distributed data storage platform where the measures of the financial information may be distinct, and in different currencies and/or expressed in different units of measure, and may be further grouped by different attributes of the associated transactional information.

An embodiment of the present invention is directed to implementing an aggregation algorithm without requiring changes to the programming of the underlying data storage platform. Further, aggregation algorithms may be efficiently reused and combined to create new aggregation algorithms without requiring changes to the programming of the underlying data storage platform.

An embodiment of the present invention is directed to deriving novel data for use in further aggregations without requiring changes to the programming of the underlying data storage platform. In addition, an embodiment of the present invention is directed to evaluating the correctness of an aggregation in an environment in which the data is volatile and likely to change.

An embodiment of the present invention is directed to computing of financial measures that may be useful in capital markets and/or other markets. Examples may include market risk, profit and loss, risk limit utilization, and the efficient management of collateral posting to a central counterparty.

According to an exemplary application, when a capital markets participant executes a transaction, the participant may be required to account for and measure a number of ongoing financial consequences of the transaction. Examples may include, but are not limited to: an associated profit and loss; a rate of change in expected profit and loss with respect to changes in prices of other financial instruments traded in the market place; an impact on available risk limits; an impact on available and/or required capital; and an impact on funding and/or collateral requirements. These exemplary consequences may be collectively referred to as "financial measures" or simply "measures." For example, they may be expressed as a money value in some currency.

Adding measures of the same type in the same currency may be considered an equivalence relation (e.g., reflexive, symmetric and transitive). In this example, the sum of the same measure values in the same currency for two different transactions may be strictly equivalent to the result of computing as a single unit of work the same measure value in the same currency for the two transactions.

The transaction may represent a contract which may have attributes in common with other contracts struck by the capital markets participant. Examples may include the following: trader/desk/legal entity executing a deal; a counterparty to the deal; a ledger in which the deal is recorded; an accounting/markets classification of the deal (e.g., "instrument type"); and an instrument type specific attributes (e.g., for an option the "strike," for a swap the "fixed rate" or "notional").

These attributes may be collectively referred to as "deal attributes" or just "attributes." As recognized by an embodiment of the present invention, capital markets participants may perform various functions, such as: arbitrarily create and manage new measures; arbitrarily create and manage new contract types, with potentially both new attributes and new attribute values; and aggregate and disaggregate financial measures by way of filtering, sorting and combining measures according to attribute and measure.

According to an exemplary application, often the volume of data for a major market participant may be significant—of the order of billions of records per day. Because of this data volume and the strict equivalence of the measure operations, the data may be stored on a distributed data storage platform to perform aggregations and disaggregations in parallel, for example.

For example, some distinct measures may be converted into a common form that permits aggregation. Moreover, some conversions may be expressed arithmetically (e.g., conversion to a common currency using an exchange rate), but others may be expressed in a general-purpose computer or computer language that can approximately simulate the computational aspects of any other real-world general purpose computer or computer language. For example, conversions may be represented by a Turing complete language. Examples may include the following: converting a measure from one unit of value to another where the mapping is non-linear (e.g., Base Point Value (BPV) to "Futures Equivalent") conversion; and a nonlinear combination of two or more separate measures (e.g., allocation of basis delta to a vega matrix). Basis Point Value represents the impact on the present value of a transaction of a one basis point change in interest rates. Because such computations are often numerically complex, the processor of an embodiment of the present invention has ready access to the data in the form most suitable for processing.

An embodiment of the present invention is directed to overcoming previously associated computation costs by providing fast computing over a resilient distributed data storage platform. Resiliency is often provided for by way of redundancy. For example, resiliency may represent the capability of withstanding hardware and/or data storage loss. With respect to redundancy, multiple copies of the data may be stored simultaneously in different locations and/or data may be transmitted and stored elsewhere on the platform should failure of a component appear likely.

According to an embodiment of the present invention, the process of converting data from a form in which computing can take place to a form in which it can be stored and/or transmitted for later retrieval may be referred to as "serialization." The inverse operation may be referred to as "deserialization." The "serialized" form of the data may represent the form written to disk, whereas the "deserialized" form may represent the form used for computation. Also, the serialized form of data is the form transmitted across a network.

According to an embodiment of the present invention, different forms for storage (e.g., serialized) and processing (e.g., deserialized) provide storage benefits from a very terse representation of the data to minimize transmission and storage costs, whereas processing benefits from a more verbose representation of the data to minimize data access costs. In addition, processing in a Turing complete environment, for example, may involve data to exhibit behavior often associated with "records" or "objects." By providing different forms of storage and processing, an operating system of an embodiment of the present invention is at liberty to store individual values of the records or objects wherever memory is available. Accordingly, writing out a contiguous array of bytes is difficult. In object oriented programming languages the verbose representation of the data may be known as an "object." An object oriented language specification usually places no requirement on the computer to store the data associated with the object in a particular way. Because of that, the computer may distribute the data for a single object in many different places in memory. It is therefore not possible to select a "starting point" and "ending point" in memory to transmit a representation of solely the object of interest from one computer to another because the object is not necessarily stored contiguously. Because of this, the computer must first marshal the data components of the object into a contiguous array of data that can be assembled, then transmitted, and finally disassembled on receipt by another computer. This process of assembly and disassembly is known as serialization and deserialization. It is a computationally expensive operation for very large numbers of objects. This is especially as cycles of data may exist within objects (e.g., data component A referring to data component B referring to data component A). Managing these cycles of data is one of the principal costs of serialization and deserialization. In addition, records that refer to themselves may create an infinite loop that may be managed explicitly by a serialization code.

An embodiment of the present invention removes the necessity for working with a deserialized form by computing aggregations directly over the serialized form without the need for deserialization. It does this by serializing the data in a novel manner that is efficient yet tractable for fast computation in a Turing complete language, for example, or other general-purpose computer or computer language. In addition, an embodiment of the present invention removes the necessity for a software release by storing source code as data and compiling the source code at runtime to process the serialized form of the data.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

FIG. 1 is an exemplary contact center deployment implementation architecture, according to an embodiment of the present invention. System 100 illustrates an exemplary implementation of a system of an embodiment of the present invention. A user may be authenticated via User Authentication 110. User interface 112 may provide an interface for the user to interact with Server 114. Cache 116 may represent a large distributed in memory data storage mechanism. Server 120 may communicate with batch report generation represented by 122. Automated batch output of data may be provided to Relational Database 126 and File Store 136. File Store 136 may also receive automated batch output of end of the day (or other time period, etc.) processes from various external data sources 140. File Store 136 communicates with database loading interface 134 that updates Relational Database 126. Relational Database 126 may represent a long term storage mechanism. In this example, the long term storage mechanism is a relational database partitioned into multiple schemas.

As shown in FIG. 1, Relational Database 126 may include partitions represented by Staging data 128, Recent data 130 and Historic data 132. Staging data 128 may use a staging schema to load the data into the database, then store procedures to transform the data into a form compatible with the rest of the data in use. Recent data 130 may use a recent schema that represents a partition of the database that is tuned to run quickly. This is because recent data answers most use cases for the system. Historic data 132 may use a historic schema that represents a partition of the database that is tuned to run slower but store much more data. This data may be accessed when users require access to data from longer ago than the earliest data in the recent schema.

Other types of data and schemas may be implemented in accordance with the embodiments of the present invention. Relational Database 126 may communicate with Cache 116 via a Cache Loader 124. For example, Cache Loader 124 may read data from Relational Database 126 and populate Cache 116.

Figure 2:
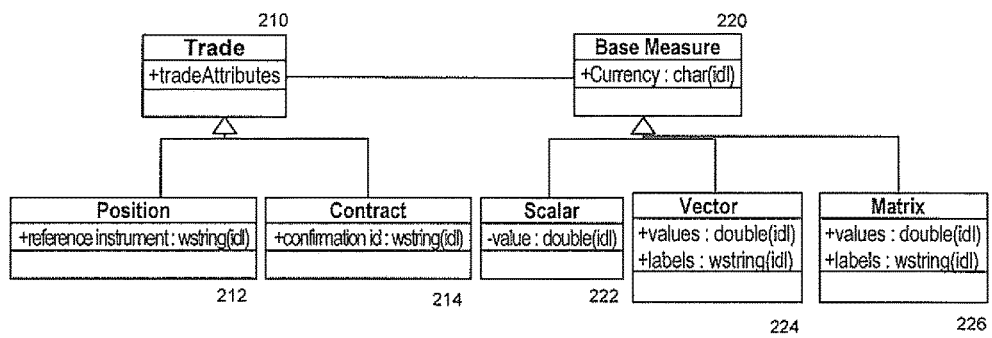
FIG. 2 is an exemplary diagram illustrating trade and measure relations, according to an embodiment of the present invention.

FIG. 2 is an exemplary diagram illustrating trade and measure relations, according to an embodiment of the present invention. As shown in FIG. 2, Trade 210 may include trade attributes. In this example, each trade has a corresponding position 212 and contract 214. Position 212 may include reference instrument and Contract 214 may include confirmation identifier.

Each measure may be associated with a trade. As shown in FIG. 2, Base Measure 220 represents a financial measure and has a corresponding currency. Base Measure 220 may have corresponding measures, including a scalar measure 222, vector measure 224 and matrix measure 226. Scalar measure 222 may include a value. Vector 224 may include values and labels. Matrix 226 may also include values and labels. Other characteristics and factors may be implemented.

According to an exemplary application of an embodiment of the present invention, the following definitions may apply. A "value" represents a real number. A "measure" (or "financial measure") represents a sequence of values of size one or greater. A base measure (shown as 220) represents a financial measure together with its currency. For example, it may be a granular unit of information that can form part of an aggregation.

In the exemplary embodiment of FIG. 2, a "scalar measure" (shown as 222) represents a sequence of one value. For example, no index (or key) into the sequence may be required beyond the name of the measure. An example scalar measure may include "mark to market." A "vector measure"

(shown as 224) represents a sequence of one or more values. For example, each value in the vector measure may be associated with a single label. A label for a vector measure may contain a single descriptor. To describe a value in the vector measure, both the value and associated of label should be stated. An example of a vector measure may be "interest rate delta indexed by tenor," where the realization of one value of which might be "3.456 at '3 months.'"

A "matrix measure" (shown as 226) represents a sequence of one or more values. Each value in a matrix may be associated with a single label. For example, the label differs to that of a vector measure in that it is a compound of two descriptors. To describe a matrix measure fully, the type of value and the type of label are stated. An example of a matrix measure may be "interest rate vega indexed by maturity and expiry," the realization of one value of which might be "7.891 at '6 months expiry, 3 months maturity."

According to an exemplary embodiment, measures may have a single currency associated with them. Semantically, the values of the measures may be considered "money values" and the currency may be associated to the values within a measure. However, according to an exemplary application, because a measure may never contain more than one currency, it may be helpful to implement and consider a measure to have a single associated currency than for each value to be a money value.

According to an exemplary embodiment, every measure may be associated to one and only one trade. A trade (shown as 210) may contain trade attributes that are common to all trades (examples being counterparty and trade date). Additionally, a trade may be one of either: a contract (in the case of a derivative) or a position (in the case of a security).

A contract (shown as 214) represents a unique legally binding agreement between two counterparties that provides for the exchange of securities between the counterparties in the case of some specific event (which may include the passage of a period of time). An example may be "an interest rate swap." Each contract may be uniquely identified by its confirmation identifier.

A position (shown as 212) may simply be a statement of the inventory held of a particular security (which may include currency). An example might be "1,234 of bond XYZ".

For example, counterparties may agree to cancel or amend contracts over time. According to an embodiment of the present invention, scope (or more fully, financial object scope) may represent a set of trades and trade versions that exist in a given moment in time. A trade version may be the contract in force for a given value date.

A value date represents the date for which the measures are associated to the trade. Trades may be associated to different measures and different measure values on different days.

A trade population strategy (or more simply a strategy) may represent a function that defines a set of trades. Valid strategies may include a predefined population of trades (usually known as a "book" which is recursively composed of "portfolios") or a function that defines the population (e.g., a set of all trades the instrument type of which is interest rate swap).

Figure 3:
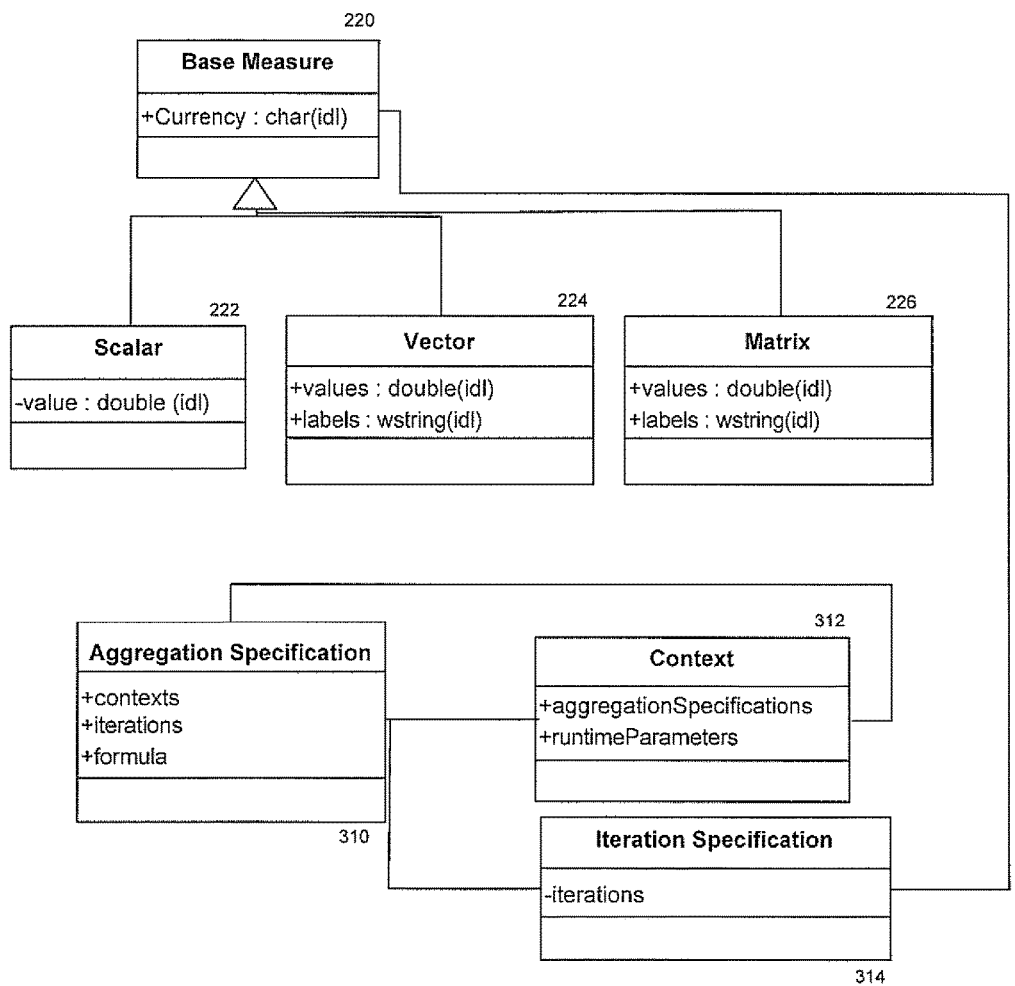
FIG. 3 is an exemplary diagram illustrating aggregation processing relations, according to an embodiment of the present invention.

FIG. 3 is an exemplary diagram illustrating aggregation processing relations, according to an embodiment of the present invention. Recursive processing may be used to describe a process or artifact, the component parts of which may be of the same type as the process/artifact as a whole. By way of example, the numbers 1 to x can be summed iteratively (e.g., by adding each number to its neighbor) or recursively by adding x to the sum of its preceding neighbors, and considering the sum of a number and its preceding neighbor to be the number itself if the preceding neighbor is zero. This exemplary second approach is recursive in that, when written formally, it may be expressed entirely in terms of itself: $sum(0,x)=x$, and $sum(n+1,x)=sum(n,x)+1$.

Similarly, an XML document may be recursively constructed of XML elements, where each XML element may contain 0 or more further XML elements.

In accordance with the embodiments of the present invention, aggregation may refer to a recursive processing of base measures with respect to populations of trades.

As shown in FIG. 3, aggregation specification (as shown by 310) may represent a document which describes an element in the aggregation process. The specification may itself be recursive in that it may be composed of aggregation specifications. For example, the aggregation specification may include Contexts 312, Iteration specifications 314 and a single Formula.

Context 312 may represent a reference to an aggregation specification together with supporting execution time data. Iteration Specification 314 may represent a reference to a measure within a referenced aggregation specification in a context. A Formula (which may be part of Aggregation Specification 310) may describe an algorithm for processing the measures made available by the iterations. For example, the formula may be expressed in any Turing complete language (or other scripting or object oriented language).

Figure 4:
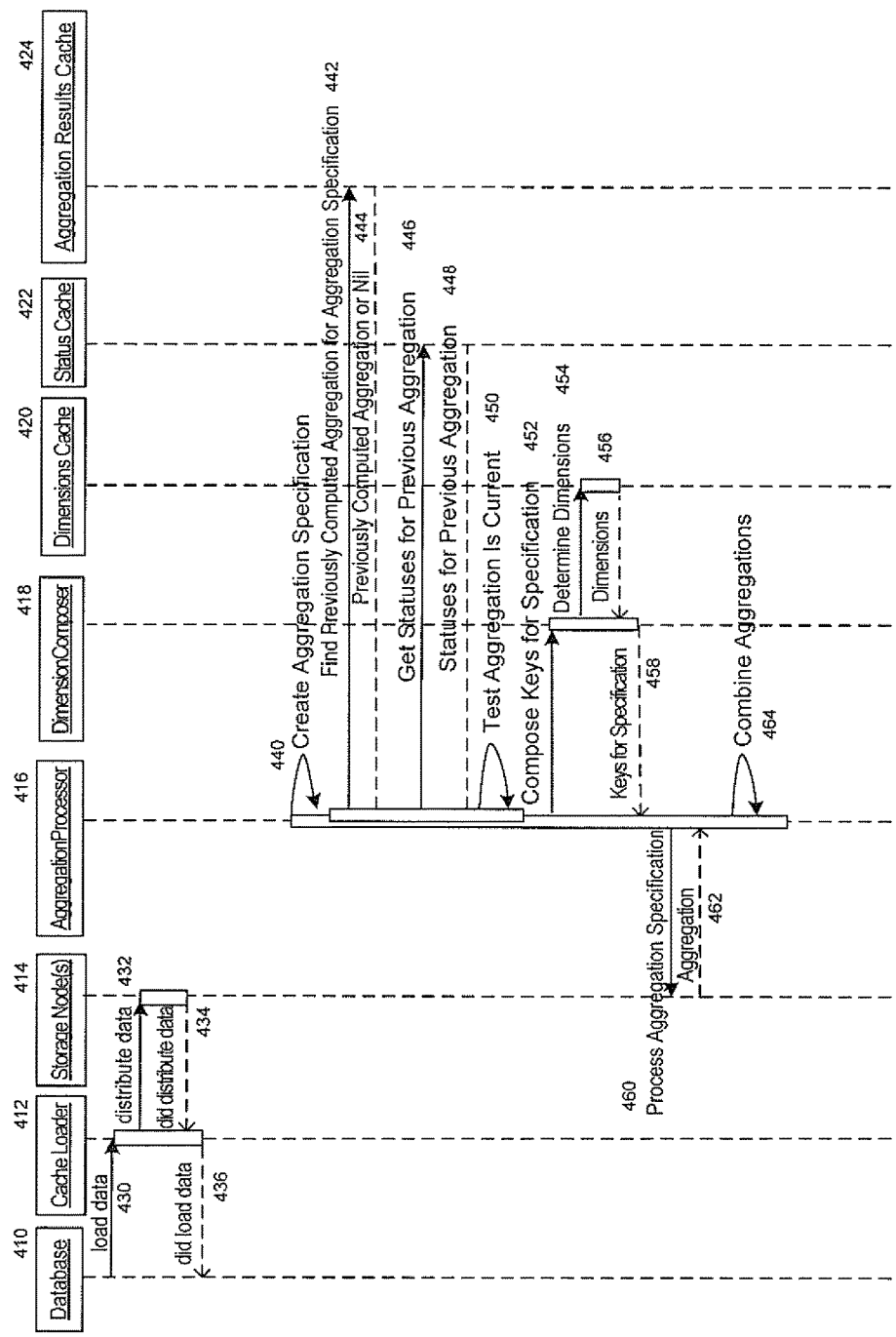
FIG. 4 is an exemplary aggregation sequence diagram, according to an embodiment of the present invention.

FIG. 4 is an exemplary aggregation sequence diagram, according to an embodiment of the present invention. FIG. 4 illustrates an exemplary sequence among various components described in FIG. 1.

Database 410 represents a long term store. Cache loader 412 may read data from the database and populate the cache, as shown by 430 and 436. Storage nodes 414 may represent a plurality of storage nodes that store the data in memory and execute aggregation specification elements, where data may be distributed as shown by 432 and 434. Aggregation processor 416 may provide an overall coordination of the process. Dimension composer 418 may create a list of data elements needed to answer the aggregation. Dimensions cache 420 may store what "dimensions" (e.g., trade attributes, measure types, etc.) are available for each trade. Status cache 422 may store what versions of data are current in the cache. Aggregation results cache 424 may store the value of previously computed aggregations together with the version information of the data used to create them.

As shown in FIG. 4, data may be provided by external systems. For example, external systems may represent large prime record systems which store the details of the trades and also compute the relevant financial measures. The data may be provided as a file or other data format. For example, the file may include various types of files, including a scope file and a measure file. According to this example, the file may be composed of at least two parts: meta data which describes the data the system has provided; and measure data which represents the data of interest. Other file formats and variations may be implemented.

According to an exemplary application, the scope file may represent a list of trade versions and trade attributes expected to be associated to subsequent measures. For example, measures that are provided for a value date of the scope file but which are for trade versions that are earlier than the trade version specified in the scope file may be rejected. For a later version of the trade to exist in the scope file, it may be determined that the trade must have been edited after the financial measure was created. The system may then defensively refuse to load the data as it may be considered stale.

According to an exemplary application, measures that attach to versions of trades later than the trades in the scope file may be warned, but not rejected. Although the scope file is stale, the measure may not be. However, it may be highlighted because potentially other measures may have been computed against a previous trade version, and would therefore be inconsistent.

According to another example, the measure file meta data may be terse. It may state the intended target implementation of the system (e.g., not all implementations load all data), the number of rows in the file (e.g., to guard against erroneous truncation of the file during transmission) and provides semantic information about the measures contained in the file (e.g., what kind of risk/P&L measure it is).

The file may be read and loaded into multiple storages. For example, the file may be loaded into a long term storage (e.g., a relational database) and, if the value date of the data is within the period most likely to be of value to users, from the database also into the cache.

An embodiment of the present invention is directed to a database schema. Some systems may not provide "clean" data, perhaps because they are vendor systems and so difficult to modify. An embodiment of the present invention may use a staging schema to load the data into the database, then store procedures to transform the data into a form compatible with the rest of the data in use.

A recent schema may represent a partition of the database that is tuned to run quickly. This is because recent data answers most use cases for the system. A historic schema may represent a partition of the database that is tuned to run slower but store much more data. It may be accessed as required on the occasions that users require access to data from longer ago than the earliest data in the recent schema.

An embodiment of the present invention is directed to creating an aggregation specification, as shown by 440. For example, the aggregation request may be created at run time. According to an embodiment of the present invention, an aggregation specification may be applied in various ways. For example, according to one example, the user may create and save one within the application. According to another example, a previously stored and named aggregation specification may be retrieved and used, as shown by 442. At step 444, a previously computed aggregation may be retrieved. If none exists, than a nil value may be received. At steps 446 and 448, statuses for previous aggregations may be requested and returned. Whether the aggregation is current or not may be tested at 450.

At step 452, keys for the specification may be composed. At steps 454 and 456, dimensions may be determined and returned. At step 458, keys for the specification may be returned. A key may represent a totality of data used to uniquely identify a measure or set of measures. For a vector measure, this may be the totality of the trade attributes (e.g., FIG. 2, 210) and a single label (e.g., FIG. 2, 224) within all labels required to uniquely identify the measure value (e.g., FIG. 2, 224) within all measure values. A dimension may represent a potential aggregation or disaggregation, e.g., the summing of one measure for all trades, or the summing of measure values within a vector or matrix measure according to a subset of labels common to the measures. At steps 460 and 462, an aggregation specification may be processed at a plurality of nodes. Aggregation processor 416 may then combine the aggregations at 464.

FIG. 5 illustrates an exemplary aggregation specification element, according to an embodiment of the present invention. An embodiment of the present invention is directed to composing the aggregation specification. An exemplary recursive structure of the aggregation specification is show by 510, 512, 514 and 516. The work that this element performs is shown at 520. For example, an aggregation specification may be composed of reusable XML components that specifies its name 511, as well as its relationship to other aggregation specifications 512 its inputs 514, 516 and the aggregation implementation 520.

Starting with the structure, the aggregation specification element in the FIG. 5 is one of many aggregation specification elements in this particular definition. The element is referenced by a name shown at 510. In this example, the element is "Explains—Estimated." It references the elements from which it is recursively composed. Its immediate parent (evident from the "treepath" element 512) is named "official T P&L reports." Child specification elements (referred to in the context of this specification element as "underlyingReport1" and "underlyingReport2") are "PNL predicts—Estimated" (shown at 514) and "Higher Order—Estimated" (shown at 516). These child specification elements are themselves composed in a similar manner.

FIG. 6 is an exemplary screenshot of a recursive aggregation specification structure, according to an embodiment of the present invention. Specifically, FIG. 6 describes relationships of aggregation specifications to one another for the purposes of executing a report named "Official T PNL—Estimated," according to the an embodiment of the present invention. The work done by the specification element is described in the Groovy Script highlighted by 520 in FIG. 5. The script text may be compiled at run time and stored in a cache as text (e.g., in the same place as the data). In this way, the distributed storage nodes may access the source scripts and compile them as needed. Accordingly, this avoids the need to distribute compiled bytecode which is hazardous because of the potential loss of the type information needed to execute it reliably.

In the case of this particular specification element, the work done may be trivial. For example, it may involve merely adding a key component (e.g., another available label) to the measures being aggregated. The terminating nodes of the aggregation specification in fact do nothing other than recover the information from the storage nodes. Other variations on the work done may be realized and implemented depending on the complexity of the system as well as the various types of applications and implementations.

Figure 7:
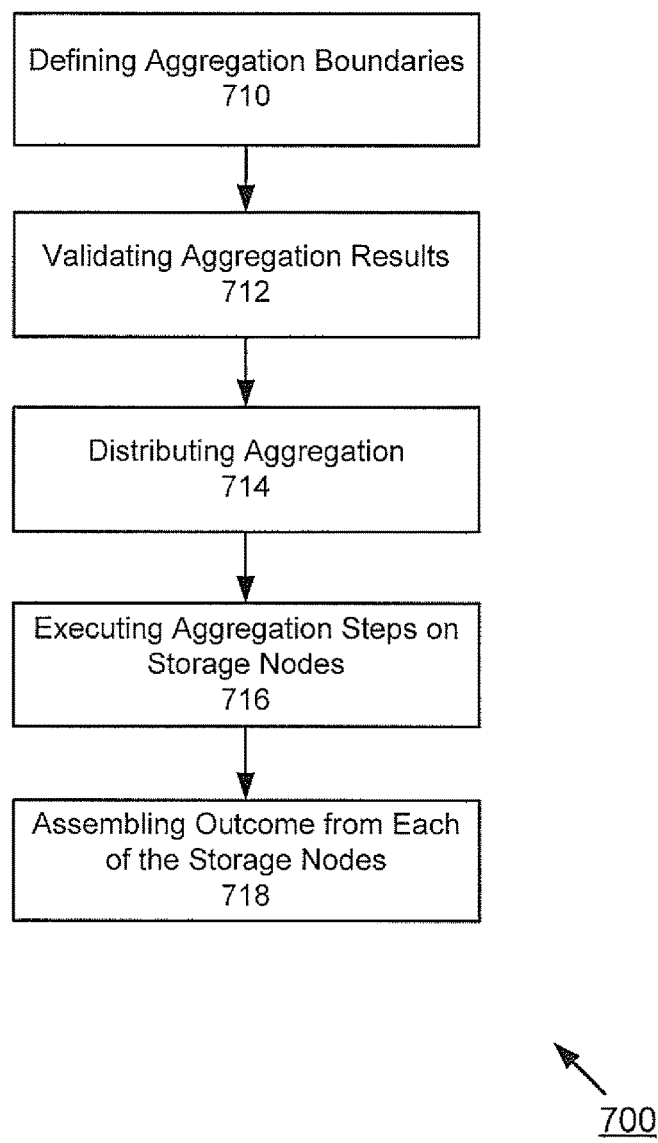
FIG. 7 is an exemplary flowchart illustrating a method for processing aggregation, according to an embodiment of the present invention.

FIG. 7 is an exemplary flowchart illustrating a method for processing aggregation, according to an embodiment of the present invention. At step 710, aggregation boundaries may be defined. At step 712, whether aggregation results are already available may be validated. At step 714, the aggregation may be distributed. At step 716, the aggregation steps may be executed on the storage nodes. At step 718, the outcome of the aggregation steps may be assembled from each of the storage nodes. The order illustrated in FIG. 7 is merely exemplary. While the process of FIG. 7 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 710, aggregation boundaries may be defined. The context of a terminating aggregation specification element may describe what measures are to be recovered for the population of trades in question. FIG. 8 provides an illustration of an exemplary terminating aggregation specification element, according to an embodiment of the present invention.

FIG. 8 describes an aggregation specification required to extract the first set of data for processing from the cache, according to an embodiment of the present invention. As described above, a key may represent a totality of all information required to uniquely identify a measure or set of measures. Keys may be composed of key components and the key in the example describes the two components required to identify the data sought (in this case, market data). In this example, these key components are the name of the market data measure ("KapitalIR CurveEOD") and the date for the measure ("EFFECTIVE_DATE", an alias for the effective date provided by the user at run time). As shown by 810, the key component is referred to as "Measure Name" and has a corresponding value.

This may be used to scope the aggregation in conjunction with other context information and together with the population of trades of interest. For example, the context may specify the application of the effective date which may be provided by reference. This may be provided by the user at run time. Also, the population of trades of interest may be provided by the user, which may be at run time. This may occur by reference to a predefined book or portfolio of trades, or by way of a trade population strategy, for example.

In this example, the aggregation boundaries may be the product of various combinations of the following:
 trade versions of interest and
 measures of interest for
 the value date(s) of interest.

According to an exemplary illustration, the aggregation boundaries may be a Cartesian product (e.g., every possible combination) of the factors above. Other mathematical operations that return a set (or product set or simply product) from multiple sets may be implemented as well.

For example, this may be conceptually expressed as a set of keys, which may represent a set of unique identifiers that recover each measure used to compute the aggregation. In the exemplary implementation, the physical storage of these keys may be optimized further. This may be a result of redundancy (or entropy) in the information. For example, the keys may be stored more efficiently than a simple list (e.g., as a map of maps).

At step 712, whether aggregation results are already available may be validated. According to an exemplary embodiment, the aggregation boundaries may be used to uniquely identify the aggregation. The aggregation results may be stored as a value keyed by the aggregation boundaries. If, in fact, aggregation results are available that match the aggregation boundaries, the aggregation results may be further examined.

This further examination may determine whether the versions of the data used to compute the cached aggregation results match the versions to the versions of data currently stored in the cache. If they do, then the aggregation results may be safely returned and there is no need to execute the aggregation. If they do not, the precomputed aggregation results may be discarded from the cache as stale.

In the event that cached aggregation results cannot be used, an embodiment of the present invention may compute the aggregation.

At step 714, the aggregation may be distributed. Within this step, the starting point may be to ensure that the functions are compiled and ready for use. This may happen as a background task. For example, whenever a change to an aggregation specification is saved, the function specified in the script may be compiled and any errors may be reported back to the user. When compilation is successful, the specification may be stored in the distributed cache.

As an optimization, the storage nodes may have an affinity to a particular set of trade identifiers. For example, the aggregation processor may distribute a subset of keys to storage nodes that are known to contain the appropriate set of keys, with instructions to perform the aggregation specification.

At step 716, the aggregation steps may be executed on a plurality of storage nodes. The storage nodes may iterate over the keys and on the assumption that trade level results are not required, the storage nodes may create a set of money records where each money record may contain a currency and an amount that answers the aggregation by performing a summation at the base measure level per trade attribute/portfolio/book or other metric; recursively executing the aggregation formula upon each of the outcomes of the initial summation and recording during the processing of the summation and aggregation the actual versions measures used, so that the outcome may be validated or invalidated for later use.

For example, should the user require the outcome of the aggregation to be at a trade level (e.g., that is a unique value assigned to each trade), the first step (step 710) may be performed differently in that the aggregation occurs in full for each trade, rather than being assembled from the outcome of the initial summation. For example, if a total aggregation across many trades is required, an efficient method of performing the aggregation may include aggregating the base measures first for all the trades first and applying the subsequent aggregation specifications only to the aggregation of the base measures. According to another example, if a disaggregation across all trades is required, then all the aggregation specifications may be applied to each and every trade. Because of this, the base aggregation may be conducted differently for an aggregation across all trades (in which case the base measures are aggregated first) than for a disaggregation across all trades (in which case no base aggregation will be conducted because every aggregation specification must be applied to every trade).

At step 718, the outcome of the aggregation steps may be assembled from each of the storage nodes. Each storage node may execute the aggregation specification in its entirety for the set of trades it has. These results may be further assembled by the aggregation processor in the same or similar way as described in step 716 into an ultimate outcome. The ultimate outcome may then be returned to the user or other recipient.

Figure 9:
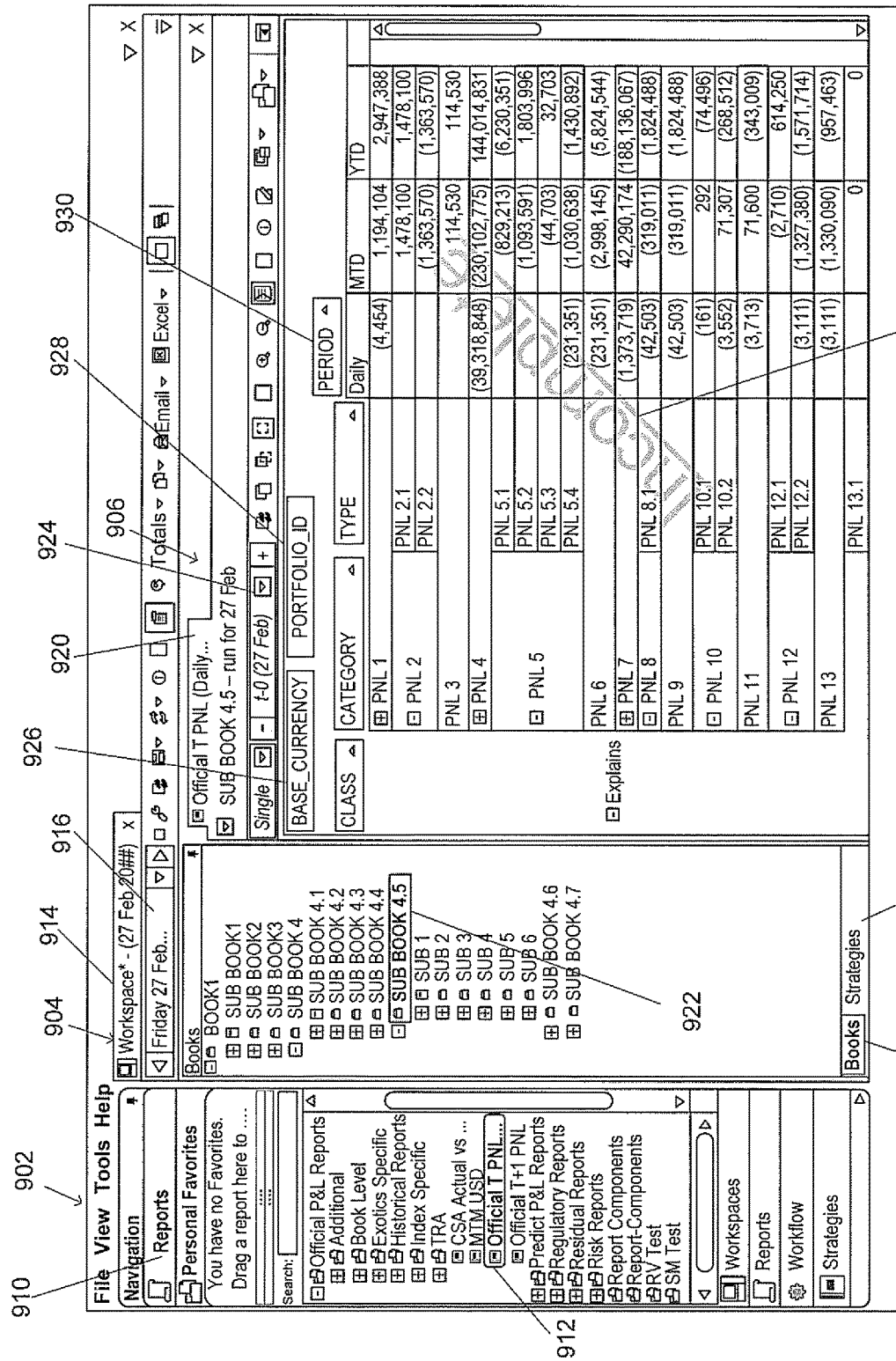
FIG. 9 is an exemplary screenshot for aggregating financial measures, according to an embodiment of the present invention.

FIG. 9 is an exemplary screenshot for aggregating financial measures, according to an embodiment of the present invention. FIG. 9 illustrates a grid of numbers showing the final aggregation for "Official T PNL" on the test system where the data is masked. In this example, the grid watermarks as being "Incomplete." This is because the system can track by way of context which data is present and absent:

FIG. 9 illustrates a Navigation Panel 902, a Workspace Panel 904 and Report Panel 906. As shown in FIG. 9, a user can select a report as shown by Reports 910. In this example, the "Official T PNL" report is selected at 912 and displayed at tab 920. Workspace 914 provides a collection of reports that allows a user to view a number of reports at once. Section 916 indicates an effective date for the report where the effective date is one of the values that may be an input into the execution of the report at runtime. As the system collects data from its own data, from the user as well as other sources, one of the key attributes may include an effective date shown at 916. Workspace 914 may also display standardized collection of trades, also shown as books by tab 918. The user may select a trade that the user is interested in. In this example, the user selects Sub Book 4.5 as shown by 922. The sub book may represent a recursive structure.

The selected report may be shown by tab 920. A user may identify additional factors, as shown by tab 924. In this example, the user may include another date to run the reports. The user may also select elements, including Base Currency 926, Portfolio ID 928 and Period 930, among others. In this example, the display provides an "Incomplete" message at 934. The system tracks what data it should have as compared to what data it actually has so that it knows what to expect at a given time and thereby alert the user when not all the data has arrived.

Strategies tab 932 allows a user to compose a collection of trades interactively. In this example, the user may select a series of books and may then add extra trades of interest and/or remove other trades.

Figure 10:
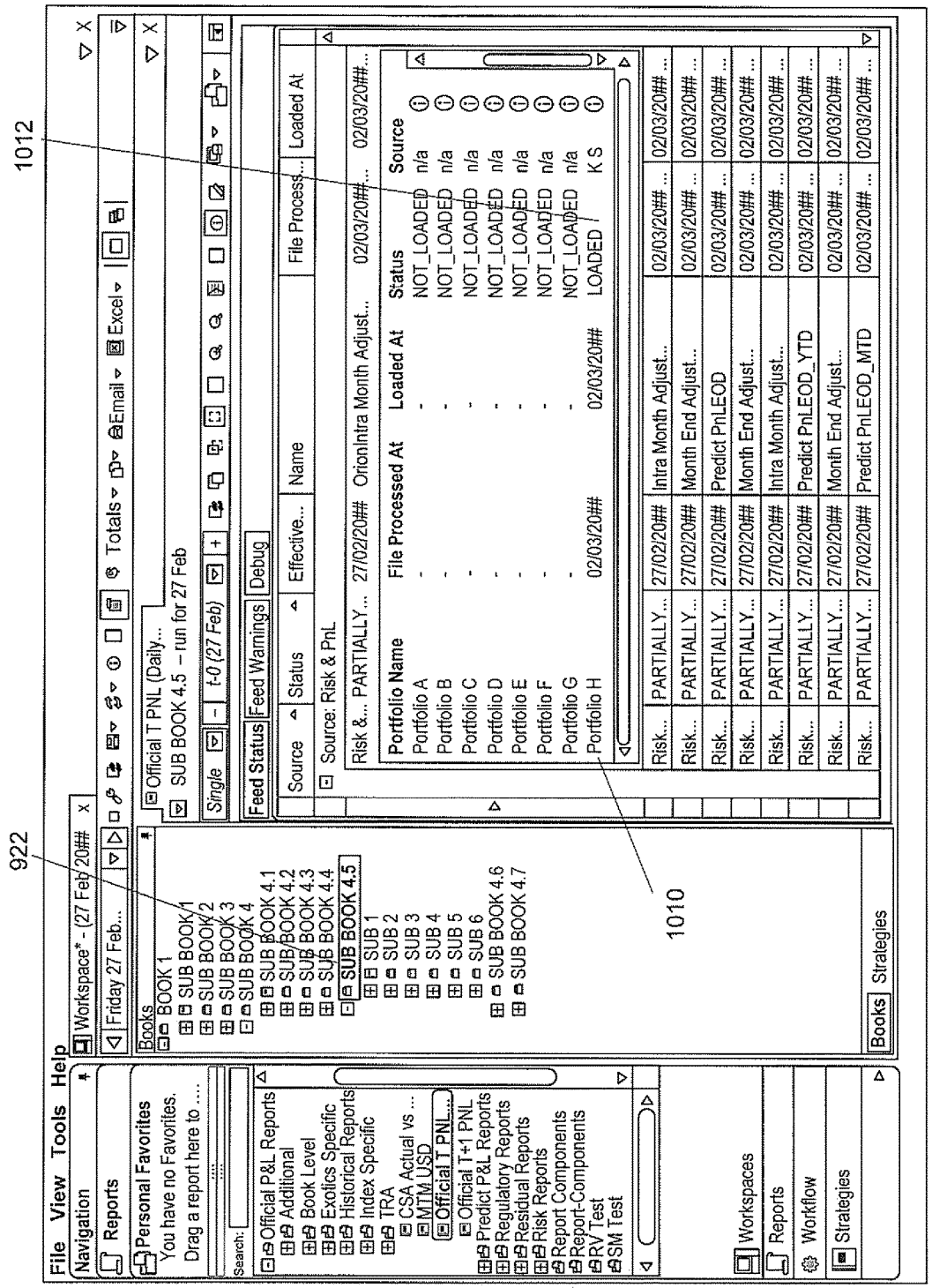
FIG. 10 is an exemplary screenshot for aggregating financial measures, according to an embodiment of the present invention.

FIG. 10 is an exemplary screenshot for aggregating financial measures, according to an embodiment of the present invention. FIG. 10 shows that only the data for a particular portfolio "Portfolio H" has been loaded, as shown by 1010 and status 1012. In particular, FIG. 10 provides the details of why FIG. 9 has been marked "Incomplete." Also, the inbuilt IDE may be used to recursively describe the transformations required to normalize, enrich as well as compute the data. In this example, the GroovyScript shown is quite complex and could not easily be achieved without a Turing Complete environment.

Figure 11:
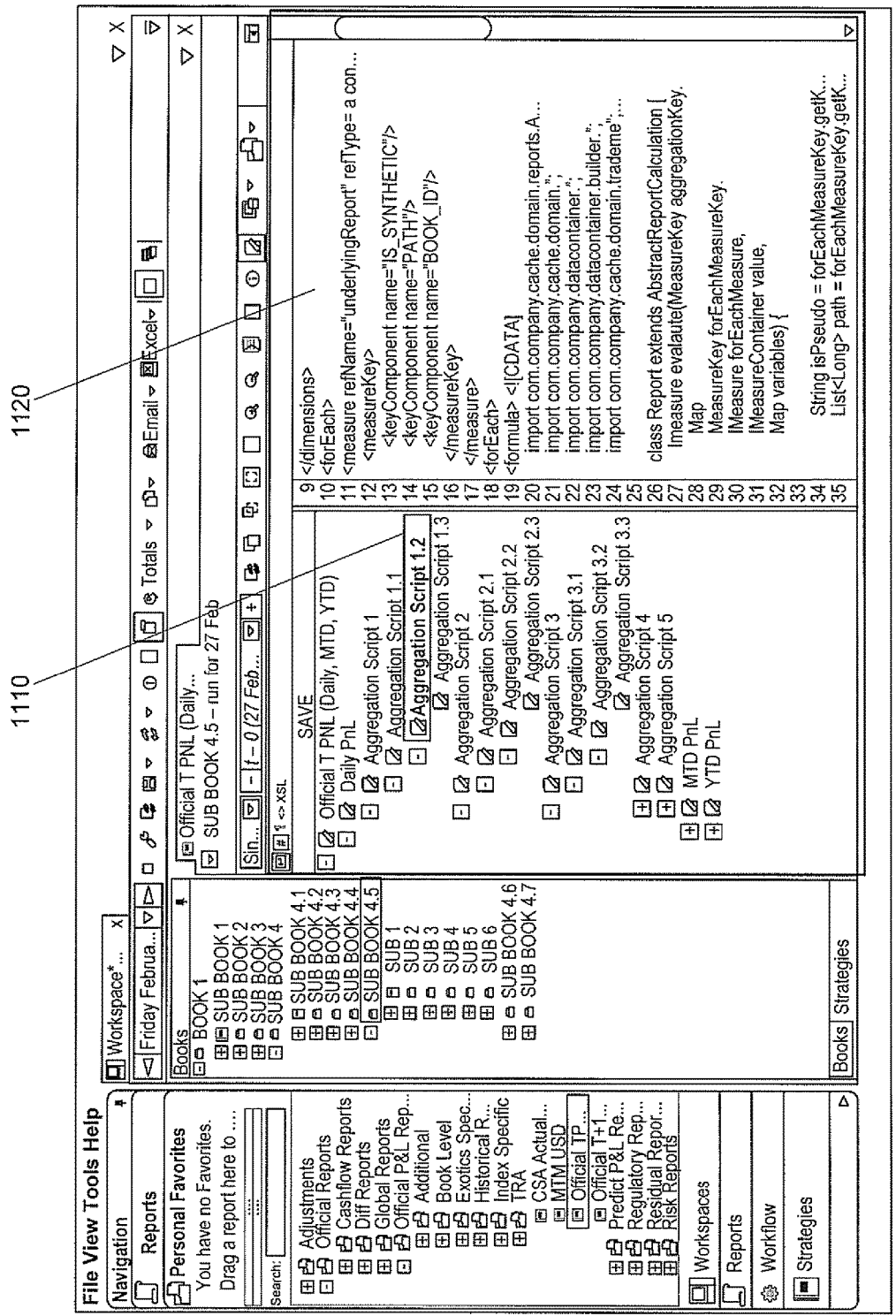
FIG. 11 is an exemplary screenshot for aggregating financial measures, according to an embodiment of the present invention.

FIG. 11 is an exemplary screenshot for aggregating financial measures, according to an embodiment of the present invention. As shown in FIGS. 10 and 11, changes to the code may be made and saved as well as distributed in real time. In this example, the details of a particular aggregation script, selected by 1110, may be displayed in Panel 1120.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical home or personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. An automated computer implemented system comprising:
  a relational database comprising financial data and further containing a plurality of schema comprising a staging schema, recent schema and historic schema;
  a distributed data storage platform that supports the relational database, the distributed data storage platform comprising a plurality of nodes; and
  a computer processor, coupled to the relational database and the distributed data storage platform, and programmed to:
    access the financial data from the relational database in the distributed data storage platform comprising the plurality of nodes;
    automatically create an aggregation specification comprising context elements, iteration elements and a formula that represents an algorithm that processes financial market measures made available by the iteration elements, based at least in part on the financial data;
    determine whether the aggregation is current;
    compose one or more keys for the aggregation specification;
    determine one or more dimensions for the keys;
    responsive to the keys and dimensions, process the aggregation specification via the plurality of nodes; and
    automatically assemble an outcome from each node of the plurality of nodes.

2. The system of claim 1, the computer processor further programmed to:
  check for a previously computed aggregation.

3. The system of claim 1, wherein the new aggregation algorithm is created without requiring changes to the programming of the underlying distributed data storage platform.

4. The system of claim 1, wherein the distributed data storage platform accesses source scripts and compiles the source scripts as needed in processing the aggregation specification.

5. The system of claim 1, wherein the keys represent a set of unique identifiers that recover each measure used to compute the aggregation specification.

6. The system of claim 1, wherein the aggregation specification is processed over a serialized form.

7. The system of claim 1, wherein the aggregation specification is processed by recursively executing an aggregation formula upon each outcome of an initial summation.

8. The system of claim 1, wherein the staging schema loads data into the relational database and stores procedures to transform data into a form compatible with data in use.

9. The system of claim 1, wherein the recent schema represents a partition that is tuned to run more quickly than the historic schema.

10. The system of claim 1, wherein the historic schema represents a partition that is tuned to run slower than the recent schema.

11. An automated computer implemented method comprising the steps of:
> storing financial data in a relational database in a distributed data storage platform comprising a plurality of nodes, wherein the relational database contains a plurality of schema comprising a staging schema, recent schema and historic schema and the distributed data storage platform comprises a plurality of nodes;
> creating an aggregation specification comprising context elements, iteration elements and a formula that represents an algorithm that processes financial market measures made available by the iteration elements, based at least in part on the financial data;
> determining whether the aggregation is current;
> composing one or more keys for the aggregation specification;
> determining one or more dimensions for the keys;
> responsive to the keys and dimensions, processing the aggregation specification via the plurality of nodes; and
> automatically assemble an outcome from each node of the plurality of nodes.

12. The method of claim 11, further comprising the step of:
> checking for a previously computed aggregation.

13. The method of claim 11, wherein the new aggregation algorithm is created without requiring changes to the programming of the underlying distributed data storage platform.

14. The method of claim 11, wherein the distributed data storage platform accesses source scripts and compiles the source scripts as needed in processing the aggregation specification.

15. The method of claim 11, wherein the keys represent a set of unique identifiers that recover each measure used to compute the aggregation specification.

16. The method of claim 11, wherein the aggregation specification is processed over a serialized form.

17. The method of claim 11, wherein the aggregation specification is processed by recursively executing an aggregation formula upon each outcome of an initial summation.

18. The method of claim 11, wherein the staging schema loads data into the relational database and stores procedures to transform data into a form compatible with data in use.

19. The method of claim 11, wherein the recent schema represents a partition that is tuned to run more quickly than the historic schema.

20. The method of claim 11, wherein the historic schema represents a partition that is tuned to run slower than the recent schema.

* * * * *